United States Patent Office 3,182,497
Patented May 11, 1965

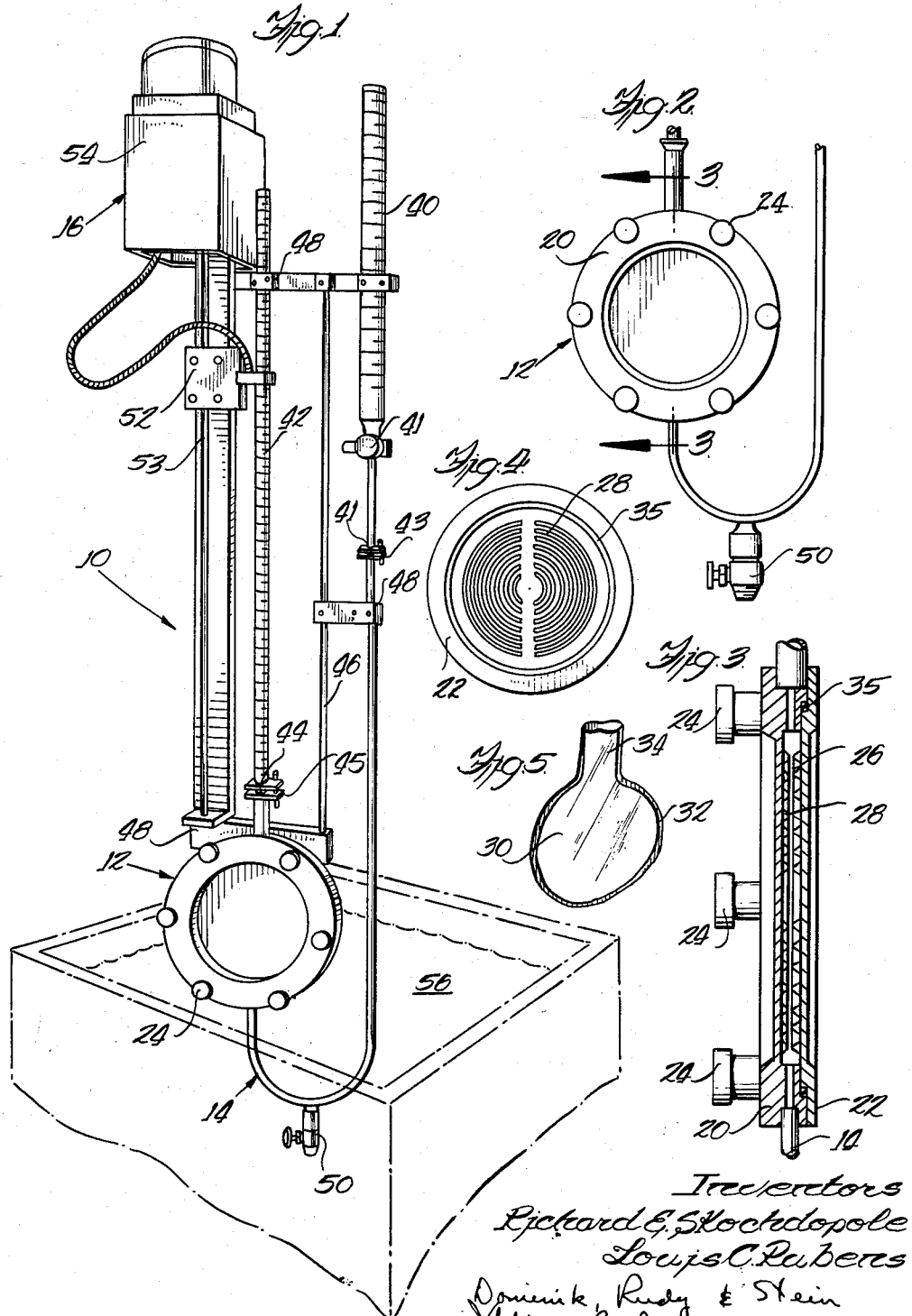

3,182,497
APPARATUS FOR DETECTING DIMENSIONAL
CHANGES OF A REACTANT SUBSTANCE
Louis C. Rubens and Richard E. Skochdopole, Midland,
Mich., assignors to The Dow Chemical Company, Midland, Mich., a corporation of Delaware
Filed July 19, 1963, Ser. No. 296,340
10 Claims. (Cl. 73—149)

This invention relates to a method and apparatus for detecting dimensional changes of a reactant substance and more specifically to a dilatometer which is capable of measuring changes which occur during the entire course of a polymerization reaction, and a method for using said dilatometer.

During polymerization, there usually is a contraction in the volume of the polymer. It apparently is the result of a reduction in the intermolecular distance between monomer units as they enter the polymer chain. For example, Tobolsky, Leonard and Roeser in The Journal of Polymer Science, volume 3, page 604 (1948) reported that when a vinyl monomer is polymerized, a double bond and a Van der Walls bond are exchanged for two single bonds with a concomitant shrinkage of 15% to 20%.

In an ideal system, one might expect this change in volume to be proportional to the number of monomers entering the polymer chain and inversely proportional to the monomer molecule volume. Actually, however, as disclosed in Nicolls and Flowers, Industrial and Engineering Chemistry, volume 42, page 292 (1950), there are deviations from this general rule, particularly in the case of n-butyl and isobutyl methacrylates. These authors introduced the concept of relating shrinkage during polymerization to the volume of revolution of the monomer molecule about its major axis and they obtained good agreement between calculated and observed contraction. If there are no serious complications, such as crystallization, hydrogen bonding, steric factors, phase separation and the like, during the course of a polymerization, it should be possible, by measuring volume changes, to equate the percent conversion of the monomer to polymeric material.

Dilatometers have been used in the past to measure such volume changes and, therefore, it cannot be here claimed that the use of a dilatometer to measure their contraction in volume is new. Indeed, over thirty years ago, Starkweather and Taylor in The Journal of The American Chemical Society, volume 62, pages 4708 to 4714 (1930), reported on their measurement of the polymerization rate of vinyl acetate using volume contraction. Subsequently, catalysis, inhibition, and retardation studies on vinyl monomers were also undertaken using a dilatometer. Unfortunately, however, the dilatometers used there are not satisfactory for obtaining a complete curve because:

(1) The active monomer was contained in a rigid vessel attached to a capillary, and therefore, as the viscosity increased, or gelation occurred, a condition was reached where the meniscus would no longer drop proportionately to the volume change. The development of bubbles or voids in the casting or pulling of the gel away from the container wall made the results very erratic.

(2) The cylindrical shape of the monomer container did not permit rapid enough heat transfer to the bath fluid to dissipate the exotherm of highly reactive systems to maintain isothermal conditions.

It is, therefore, an object of this invention to provide a new means for measuring dimensional changes of a reactant substance.

Another object is to provide a dilatometer which is capable of measuring contractions in volume of monomers as they are polymerized.

Still another object is to provide a dilatometer, of the above character, which measures the rate of polymerization accurately even though there may be an increase in viscosity with the consequent danger of development of bubbles or voids in the polymer.

A further object is to provide a dilatometer which has rapid heat transfer to dissipate the exotherm of highly reactive polymerization systems whereby isothermal conditions may be easily maintained.

A still further object is to provide a dilatometer which can be easily loaded for test purposes.

Another object is to provide a dilatometer which is easily sealable once loaded.

Another object is to provide a dilatometer which is unaffected by corrosive substances sometimes found in monomeric material.

Other objects of the invention will in part be known and will in part appear hereinafter.

A new type dilatometer has now been developed which is capable of determining all volume changes as they occur during the course of a polymerization reaction. The polymerizable material, or monomer, is contained within a thin flexible bag preferably made of thin inert plastic film. The bag, in its assigned location in the dilatometer, is supported in sheet form within a sealed, stainless steel cell by reason of ridges integrally formed on the walls of the cells. The cell, after sealing, is filled with mercury. Thereafter, as the volume of the polymerizable material in the cell changes, so does the level of the mercury, and this change in level is detected by incorporating the cell into a manometer tube assembly. Electrical sensing means associated with the tube automatically detects the level changes with time.

In use, the cell is immersed and maintained in a thermostated water bath. Due to the extended condition of the bag in the cell, heat transfer to the cell contents is extremely rapid. Also, as the polymerization proceeds, and the contents contract, the film bag likewise contracts to accommodate the new volume. Hence, there is no introduction of cracks or bubbles in the polymerizate as in rigid containers to cause errors in reading volume changes.

In addition, the cell is simple to load and operate. The automatic recording device, which follows changes in the height of the mercury in the capillary tube manometer, used as a function of time, makes the task even simpler.

A detailed description of one embodiment of the cell and then its use will now be described in detail to illustrate the many advantageous features of the new dilatometer.

Reference is now made to the drawings in which:

FIG. 1 is a perspective view of the dilatometer of this invention showing it as it would appear during use.

FIG. 2 is a detailed side view of the load cell of the dilatometer.

FIG. 3 is a cross-sectional view of the load cell taken along lines 3—3 of FIG. 2.

FIG. 4 is a rear elevational view of the back plate of the load cell of FIG. 2.

FIG. 5 is an elevational view of the plastic bag utilized in the load cell.

*Structure of the dilatometer.*—As seen in these figures, the dilatometer, generally indicated as 10, consists of a load cell 12, a volume change response means, such as a U-tube 14 which in conjunction with the load cell acts as a manometer and, for automatic operation, a photoelectric follower mechanism 16. Although the combination of load cell, volume change response means and photoelectric follower mechanism, comprises an important combination, the essence of the mechanism lies in the load cell and in the flexible container contained therein, and therefore they will first be described in detail.

As shown in FIGS. 2, 3, and 4, the load cell consists of a front and a back plate 20 and 22, respectively, preferably circular in design. It is preferred that they be made of stainless steel to avoid any problems due to corrosion.

When joined together, such as illustrated in FIG. 3, via screw knobs 24, they define a load-cell cavity 26 for the containment of a flexible container, such as a film bag 30 with monomer therein for study of its polymerization rate. The cavity 26 is preferably of pancake shape so as to insure thorough and uniform temperature control over the exothermic reaction occurring within the film bag in the load cell.

The inside surface of the front and back load cell plates 20 and 22 contain a series of concentric ridges 28 (see especially FIG. 4) for the purpose of holding the bag 30 in a substantially extended and preferably flat condition.

The cell is assembled by placing the bag on the back plate 22. The neck 34 of the bag is preferably allowed to protrude out over the edge about two inches so that when the front plate 20 of the cell 10 is bolted to the back plate 22, the O-ring 35 compresses the neck 34 to not only seal the cell 12 but also close off the top of the monomer filled bag 30. Since the O-ring 35 seals the bag 30 below the level of liquid in the bag, there is no tendency to entrap air bubbles in the monomer liquid.

As shown, the load cell 12 is used with a volume change response means, such as a U-tube 14, in such a fashion that a manometer is created when the U-tube is filled with mercury.

The U-tube 14 has a reservoir 40 connected to its upper right arm, via ground glass joint 41 and clamp 43, as seen in FIG. 1. The left arm of the U-tube 14 contains the load cell 12 and a graduated capillary 42 affixed thereto via a ground glass joint 44. A clamp 45 locks the joint.

The entire assembly, load cell 12, U-tube 14, with reservoir 40 and graduated capillary 42 affixed to its two arms, is supported in a vertical position during use via support stand 46 having a series of clamp arms 48 which grasp the assembly at various points.

It will be noted from FIGS. 1 and 2 that the elbow of the U-tube 14 contains a stop-cock 50 which facilitates drainage of the cell after use.

The clamp arms 48 of the support stand 46 also provide support for a photoelectric follower mechanism 16. The latter consists of a follower 52 having an electric eye means which scans the graduated capillary 42. The follower 52 rides along vertical track 53. A recording mechanism 54 follows the position of the follower and correlates changes in volume within cell 12 by noting the change in the height of mercury in the graduated capillary 42.

The detailed mechanism of the photoelectric follower can obviously be of various designs. Here, the photoelectric follower system consisted of a light source (6 volt) and two Clairex CL-3 photo cells, one reference and one measuring light through the glass capillary. The photo cells are in a balanced Wheatstone bridge circuit so that the unbalance is input to a Brown Inst. Co. amplifier. The unbalance signal is amplified to drive a servo-motor that is geared to the light source-photo cell assembly causing it to raise or lower depending upon the unbalance signal. The polarity is such to cause the servo to seek balance at the meniscus of the mercury column. Thus, as the mercury column moves, the photo cell detects the movement and signals its servo to seek a new balance. The full travel is 15.5 inches (39.4 cm.) and is detected by a 10 turn helipot geared to the servo motor through a worm, worm gear, and a clutch. The helipot is the measuring potentiometer in another balanced Wheatstone bridge circuit of a Brown Inst. Co. strip chart recorder. This is calibrated to give full travel of the screw and photo cell at about 85% of the full chart travel. This allows for about 15% zero adjustment to align the recorder zero with the mercury column starting point.

The full measuring system then consists of a Brown strip chart recorder which can be mounted remote, a ten turn helipot driven by the photoelectric follower servo, and a photo cell pickup system and drive system mounted on the dilatometer capillary.

*Use of the dilatometer.*—The cell, as shown in FIG. 1, is used in a vertical position. The flexible container within the cell is first filled with the reactant substance to be studied. It is then sealed within the cavity of the cell. Then the cavity is filled with sufficient mercury to reach a desired height in the capillary.

The filled cell is then immersed in a thermostated bath at an elevated temperature by setting the entire clamp assembly as shown in FIG. 1 into the bath or else by bringing the bath 56 up into contact with the dilatometer.

When the cell is first immersed into the bath, the contents expand. To minimize the effects of such initial expansion, the stop-cock at the bottom of the reservoir 40 is left open. Thus any increase in volume in the load cell due to temperature expansion is absorbed and minimized. As soon as the cell and the contents reach bath temperature, the stop-cock 41 of the reservoir 40 is closed. Thereafter, volume changes in the cell contents are reflected by changes in the height of fluid in the graduated capillary 42. At this time, the photoelectric follower mechanism 60 is placed into operation so that it follows and records the volume change with time lapse.

In an actual run to determine the speed at which an organic liquid, triisopropyl benzene in the film bag equilibrates with different bath temperatures, the following results were obtained:

TABLE I

*Time=temperature relationships for dilatometric cell contents after immersion in thermostated baths*

| No. | Bath fluid | Bath temp. (° C.) | Temp. of cell (° C.) at — | | | | | | | | | | | | | |
|---|---|---|---|---|---|---|---|---|---|---|---|---|---|---|---|---|
| | | | *0 | *10 | *20 | *30 | *50 | *70 | *90 | *120 | *150 | *180 | *210 | *240 | *270 | *300 |
| 2-1 | Water | 54 | 25 | 39 | 46 | 50 | 52 | 53 | 54 | 54 | | | | | | |
| 2-2 | ----do---- | 67 | 25 | 44 | 54 | 59 | 64 | 66 | 67 | 67 | 67 | | | | | |
| 2-3 | ----do---- | 78 | 25 | 50 | 62 | 68 | 75 | 77 | 78 | 78 | 78 | | | | | |
| 2-4 | ----do---- | 85 | 25 | 56 | 67 | 70 | 81 | 84 | 85 | 85 | 85 | | | | | |
| 2-5 | ----do---- | 89 | 25 | 70 | 79 | 84 | 88 | 89 | 89 | | | | | | | |
| 2-6 | Triethylene glycol | 85 | 25 | 32 | 37 | 43 | 52 | 59 | 65 | 72 | 76 | 79 | 81 | 83 | 84 | 84 |
| 2-7 | ----do---- | 97 | 25 | 36 | 46 | 53 | 63 | 71 | 77 | 84 | 89 | 92 | 92 | 95 | 95 | 96 |
| 2-8 | ----do---- | 105 | 25 | 35 | 43 | 50 | 63 | 74 | 82 | 91 | 96 | 99 | 102 | 103 | 104 | 104 |
| 2-9 | ----do---- | 112 | 25 | 38 | 48 | 57 | 71 | 82 | 91 | 99 | 104 | 107 | 109 | 111 | 112 | 112 |
| 2-10 | ----do---- | 127 | 25 | 42 | 56 | 66 | 84 | 97 | 106 | 114 | 120 | 124 | 126 | 126 | 126 | 127 |
| 2-11 | ----do---- | 141 | 25 | 44 | 60 | 73 | 91 | 107 | 117 | 128 | 134 | 138 | 139 | 140 | 140 | 141 |

*Seconds.

It is evident that a fairly rapid equilibration of the temperature of the cell and the water bath occurs. And although there is some lapse of time which necessarily permits some polymerization, in most reactions of interest, the heat-up time is fairly small to total reaction time of the monomer.

EXAMPLE I

The following experiment was made with the dilatometer of the invention to attempt to correlate the percent conversion of styrene to polymer by coulometric bromine titration for residual monomer and shrinkage measurements.

0.5 gram of benzoyl peroxide was dissolved into 100 grams of styrene monomer. A 3.0198 gram sample of this monomer was loaded into the film bag and sealed in the dilatometer. The unit was then filled with mercury. Also, a series of 6 mm. glass ampoules (some containing small pieces of film similar to the bag) were filled with 1–1.25 grams of the same monomer and sealed. These ampoules were attached to the dilatometric cell so that they would be immersed in the 80° C. water bath simultaneously with the cell. The rate of fall of the mercury level in the capillary was recorded and, at various intervals, ampoules were removed and immediately chilled in Dry Ice to stop polymerization. The ampoules containing the partially polymerized styrene were analyzed by titration to determine the amount of residual monomer.

The percent conversion of monomer to polymer vs. time was calculated from the dilatometric data using the following equation:

$$\text{Percent polymer at time } T = \frac{R_0 - R_T}{R_0 - R_F} \times 100$$

Wherein:

$R_0$ = initial height of Hg in the capillary
$R_T$ = height at time T
$R_F$ = final height The above equation assumes additivity of monomer and polymer volumes in partially polymerized styrene. Comparative data obtained by residual monomer titration was also obtained.

The following table summarizes the results obtained and indicates the correlation of the dilatometric data with the tedious titration data:

| Sample No. | Time at 80° C. (mins.) | Dilatometric data | | Percent solids by titration | |
|---|---|---|---|---|---|
| | | Percent solids (addtv. vols.) | Percent solids (addv. densities) | No film present | Film present |
| 3-1 | 30 | 10 | 8.5 | | |
| 3-2 | 52 | 15.5 | 13.2 | 13.09 | |
| 3-3 | 100 | 25.8 | 23.2 | | |
| 3-4 | 111 | 28.0 | 25.5 | 25.49 | 24.49 |
| 3-5 | 150 | 35.0 | 32.0 | | |
| 3-6 | 177 | 39.5 | 36.0 | 36.3 | |
| 3-7 | 200 | 43.5 | 40.0 | | |
| 3-8 | 227 | 47.5 | 43.9 | 45.6 | |
| 3-9 | 286 | 56.3 | 52.2 | 54.79 | 50.77 |
| 3-10 | 350 | 62.1 | 58.6 | | |
| 3-11 | 355 | 67.2 | 63.6 | 70.5 | 66.4 |
| 3-12 | 400 | 75.4 | 72.0 | | |
| 3-13 | 450 | 85.3 | 82.8 | | |
| 3-14 | 500 | 93.0 | 91.5 | | |
| 3-15 | 556 | 98.0 | 97.7 | 97.59 | 97.43 |
| 3-16 | 563 | 98.0 | 97.7 | 97.39 | 97.34 |
| 3-17 | 709 | 98.0 | 97.7 | 97.71 | 98.01 |

EXAMPLE II

A medium reactivity unsaturated isophthalic-maleic polyester resin was obtained from Molded Fiberglas Company. This resin (MFG-3482M) did not contain styrene. It was a clear, straw colored, extremely viscous material. For normal use in production of reinforced plastics, this resin is diluted with 30–40% styrene.

This resin contains one maleic double bond for each 420 mol wt. unit and theoretically should require 0.379 gram $Br_2$ gm.$^{-1}$ resin for saturation, but bromine does not add readily to this maleic double bond. Thus, this resin can be diluted with styrene and the extent of cure measured by coulometric bromination of residual styrene to cross-check the conversions calculated from shrinkage measured by the dilatometer.

The MFG-3482M polyester was mixed with styrene to form a 50% solution by weight. Twenty p.p.m. of para tert butyl catechol (TBC) was added to prevent polymerization during dissolution of the polyester at room temperature. The resin solution had a viscosity of 30–40 cps. at room temperature. The solution was designated 50/50 PE-Sty.

The data listed in Table III is that of coulometric bromination for determination of unsaturation.

TABLE III

Coulometric bromination of resin solutions in tetrahydrofurane

| No. | Composition | Percent styrene monomer in solution | Theoretical percent styrene in solution |
|---|---|---|---|
| 1 | 1 gm. 50/50 PE-Sty, 9 gms. THF | 4.85 | 5.00 |
| 2 | 1 gm. pure polyester, 9 gms. THF | 0.0225 | 0.00 |
| 3 | 1 gm. pure styrene, 9 gms. THF | 10.23 | 10.00 |
| 4 | Pure tetrahydrofurane | 0.0225 | 0.00 |

The 50/50 PE-Sty resin solution was mixed with 1.0% benzoyl peroxide for the polymerization rate study. The resin was vacuum degassed prior to filling the film bag with a 5 gm. sample for the dilatometric rate measurement. A slight loss of styrene during the degassing resulted in the following composition in the rate cell:

Percent
MFG-3482M polyester _____ 51.40
Styrene _____ 47.58
Benzoyl peroxide ($Bz_2O_2$) _____ 1.02

The same composition was used to fill 20 small film bags (0.5″ x 3.5″) with approximately 2.0 gm. samples. These samples were polymerized in a special cell which duplicated the conditions in the dilatometer concurrent with the dilatometric measurement. The sample filled bags were removed at various time intervals and immediately chilled in Dry Ice to stop polymerization. Afterwards they were placed in sufficient cold tetrahydrofurane (THF) (containing 200 p.p.m. TBC) to dilute the initial resin to 10% by weight. The film bags were slit with a surgical scalpel to expose the partially polymerized resin to the THF. After one week storage at −25° C. the THF had swollen and caused partial disintegration of all of the test samples. The THF-resin mixtures were then shaken vigorously for several hours at room temperature prior to analysis for residual styrene by coulometric bromination.

The dilatometer was operated in the usual fashion to produce a recording of meniscus height of the mercury in the capilary as a function of time. The percent conversion versus time was calculated by using the equation above.

Use of the equation, of course, assumes volumetric contraction proportional to conversion and is known to be in slight error in the case of styrene.

It is normal practice in dilatometric rate determinations to permit the sample to remain in the cell for a half hour or longer after there is no further change in the mercury meniscus level. Usually the contraction asymptotically approaches a limiting value with time and it is possible (particularly with very low reactivity monomers) that the conclusion of the polymerization reaction may not be detected by this method. With high reactivity systems such as the unsaturated polyester-styrene resins, the final mercury height can be accurately determined, but there is still no assurance that this value represents complete conversion.

TABLE IV

*Comparison of conversion vs. time for 51.4% isophthalic-maleic polyester, 47.58% Styrene, 1.02% $Bz_2O_2$ Mixture at 80 C. by dilatometry and coulometric bromination of residual styrene*

| Sample | Reaction time (min.) | Percent conversion of styrene to polymer | | |
|---|---|---|---|---|
| | | (A) Dilatometric | (B) Bromination | (C)[1] |
| 1 | 7.2 | 6.7 | 4.5 | 6.5 |
| 2 | 9.5 | 16.7 | 21.5 | 16.0 |
| 3 | 12.7 | 29.0 | 26.5 | 28.1 |
| 4 | 16.2 | 40.5 | 36.6 | 39.2 |
| 5 | 20.2 | 52.3 | 56.0 | 50.7 |
| 6 | 26.0 | 63.5 | 69.5 | 61.5 |
| 7 | 29.0 | 68.5 | 70.5 | 66.4 |
| 8 | 32.0 | 73.5 | 76.5 | 71.2 |
| 9 | 36.0 | 78.5 | 81.5 | 76.1 |
| 10 | 40.0 | 83 | 85.5 | 80.4 |
| 11 | 50 | 91.5 | 86.5 | 88.6 |
| 12 | 56 | 94.5 | 90.0 | 91.6 |
| 13 | 74 | 98.5 | 93.8 | 95.4 |
| 14 | 105 | 100.0 | 95.5 | 96.9 |
| 15 | 140 | 100.0 | 96.9 | 96.9 |
| 16 | 300 | 100.0 | 96.9 | 96.9 |

[1] Column A×96.9% (assuming that $R_F$ of the equation above represented only 96.9% conversion as indicated by titration of samples 15 and 16), column C would be a corrected conversion.

From the data above, it is obvious that there is not a perfect agreement between dilatometric and bromination values for conversion. The bromination values show both positive and negative deviation from the dilatometric values, tending to be somewhat lower at the beginning and end of the reaction and slightly higher in the 70–85% conversion range.

It should be obvious, however, that only the fine points are being considered in discussing the above data. From a practical point of view, the polymerization rate determination can work reliably, determined by either method. But for precise work, it is advisable to determine the residual monomer in a dilatometer sample when shrinkage stops and the reaction is terminated.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what we claim as new, and desire to secure by Letters Patent, is:

1. A dilatometer useful for determining the characteristics of a reactant substance even though said substance may become viscous comprising a volume change response means and a load cell in series with said volume change response means, said cell containing a cavity with a sealed bag therein, said bag containing the substance to be studied.

2. A dilatometer useful for determining the characteristics of a reactant substance even though said substance may become viscous comprising a volume change response means and a load cell in series with said volume change response means, said cell having means which define a sealed cavity of thin cross sectional dimension and said cavity containing a sealed flat bag with the substance to be studied therein.

3. A dilatometer useful for determining the characteristics of a reactant substance even though said substance may become viscous, comprising a U-tube and a load cell in series with said U-tube, said cell being formed of two plate members fastened at their peripheries to define a flat cavity therebetween, said cavity containing a sealed flat bag with the substance to be studied therein.

4. A dilatometer useful for determining the physical characteristics of a reactant substance even though said substance may become viscous comprising a U-tube, a load cell in series with said U-tube and a photoelectric follower mechanism positioned adjacent one arm of said U-tube, said cell being formed of two plate members fastened at their peripheries to define a flat cavity therebetween, said cavity containing a sealed flat bag with the substance to be studied therein.

5. A dilatometer useful for determining the physical characteristics of a reactant substance even though said substance may become viscous comprising a U-tube, one arm of which comprises a capillary tube, a load cell in series with said U-tube and a photoelectric follower mechanism positioned adjacent said capillary tube arm of said U-tube, said cell being formed of two plate members fastened at their peripheries to define a flat cavity therebetween, said cavity containing a sealed flat bag with the substance to be studied therein.

6. A dilatometer useful for determining the physical characteristics of a reactant substance even though said substance may become viscous comprising a U-tube and a load cell in series with said U-tube, said cell being formed of two plate members bolted together at their peripheries to define a flat closed cavity therebetween, said cavity containing a sealed flat bag which substantially conforms with the inner volume of said cavity, means on the inner wall of said cavity to maintain said bag in an extended, substantially flat, condition within said cavity, said bag containing the substance to be studied.

7. A dilatometer useful for determining the physical characteristics of a reactant substance even though said substance may become viscous, comprising a U-tube and a load cell in series with said U-tube, said cell being formed of two round plate members of similar diameter bolted together at their peripheries with removable threaded bolts, an O-ring seal between said peripheries of said plates, said bolted assembly defining a pancake-shaped closed cavity therebetween, said cavity containing a flat round film bag having a diameter less than said O-ring seal and a neck extending beyond said O-ring seal whereby upon bolting said plate members together said neck is sealed against leakage, concentric ridges on the inner walls of said cavity to maintain said bag in an extended substantially flat condition within said cavity, said bag containing the substance to be studied.

8. A load cell for a dilatometer which is useful for determining the physical characteristics of a reactant substance even though said substance may become viscous comprising two plate members fastened at their peripheries to define a flat cavity therebetween, said cavity containing a sealed flat bag with the substance to be studied therein.

9. A load cell for a dilatometer which is useful for determining the physical characteristics of a reactant substance even though said substance may become viscous comprising two plate members bolted together at their peripheries to define a flat closed cavity therebetween, said cavity containing a sealed flat bag which substantially conforms with the inner volume of said cavity, means on the inner wall of said cavity to maintain said bag in an extended, substantially flat, condition within said cavity, said bag containing the substance to be studied.

10. A load cell for a dilatometer which is useful for determining the physical characteristics of a reactant substance even though said substance may become viscous comprising two round plate members of similar diameter bolted together at their peripheries with removable threaded bolts, an O-ring seal between said peripheries of said plates, said bolted assembly defining a pancake-shaped closed cavity therebetween, said cavity containing a flat round film bag having a diameter less than said O-ring seal and a neck extending beyond said O-ring seal whereby upon bolting said plate members together said neck is sealed against leakage, concentric ridges on the inner walls of said cavity to maintain said bag in an extended substantially flat condition within said cavity, said bag containing the substance to be studied.

References Cited by the Examiner

UNITED STATES PATENTS 2,831,340  4/58  Crandall et al. _____ 73—16

FOREIGN PATENTS 1,178,634  12/58  France.

RICHARD C. QUEISSER, *Primary Examiner.*